US012586209B2

(12) United States Patent
Yang et al.

(10) Patent No.: US 12,586,209 B2
(45) Date of Patent: Mar. 24, 2026

(54) MECHANISM CAPABLE OF DETECTING MOTIONS OF DIFFERENT SURFACE TEXTURES WITHOUT NEEDING TO PERFORM OBJECT IDENTIFICATION OPERATION

(71) Applicant: PixArt Imaging Inc., Hsin-Chu City (TW)

(72) Inventors: Chung-Ting Yang, Hsin-Chu City (TW); Chin Seang Seow, Penang (MY)

(73) Assignee: PixArt Imaging Inc., Hsin-Chu City (TW)

( * ) Notice: Subject to any disclaimer, the term of this patent is extended or adjusted under 35 U.S.C. 154(b) by 441 days.

(21) Appl. No.: 18/139,928

(22) Filed: Apr. 26, 2023

(65) Prior Publication Data

US 2024/0362795 A1     Oct. 31, 2024

(51) Int. Cl.
*G06T 7/20* (2017.01)
*G06T 7/40* (2017.01)
*G06T 7/50* (2017.01)

(52) U.S. Cl.
CPC . *G06T 7/20* (2013.01); *G06T 7/50* (2017.01)

(58) Field of Classification Search
USPC .......................................... 382/103, 107, 153
See application file for complete search history.

(56) References Cited

U.S. PATENT DOCUMENTS

| | | | | |
|---|---|---|---|---|
| 8,379,934 | B2 * | 2/2013 | Jasinski | H04N 23/684 348/229.1 |
| 8,773,595 | B2 * | 7/2014 | Zafarifar | H04N 7/014 375/240.16 |
| 9,235,880 | B2 * | 1/2016 | Kannermark | G06T 5/73 |
| 9,852,513 | B2 * | 12/2017 | Wu | G06T 7/215 |
| 11,736,823 | B2 * | 8/2023 | Kim | H04N 25/79 348/222.1 |
| 2012/0201427 | A1 * | 8/2012 | Jasinski | H04N 23/684 382/107 |
| 2013/0162855 | A1 * | 6/2013 | Kannermark | G06T 5/73 348/222.1 |
| 2017/0256065 | A1 * | 9/2017 | Wu | G06T 7/215 |
| 2022/0141401 | A1 * | 5/2022 | Kim | H04N 25/00 |
| 2023/0353892 | A1 * | 11/2023 | Kim | H04N 25/47 |

* cited by examiner

*Primary Examiner* — Ishrat I Sherali
(74) *Attorney, Agent, or Firm* — Winston Hsu

(57) ABSTRACT

A method of an optical sensor includes: using a single image sensor array of the optical sensor to capture and generate an image frame; selecting a plurality of image regions within the image frame, the plurality of image regions being not overlapped; detecting a plurality of motion results of the plurality of image regions respectively and individually based on images of the plurality of image regions without performing object detection; and determining a plurality of motions of surface feature images respectively within the plurality of image regions according to the plurality of motion results of the plurality of image regions.

10 Claims, 5 Drawing Sheets

R1

R2

Image frame size

First strip object

Second strip object

MECHANISM CAPABLE OF DETECTING MOTIONS OF DIFFERENT SURFACE TEXTURES WITHOUT NEEDING TO PERFORM OBJECT IDENTIFICATION OPERATION

BACKGROUND OF THE INVENTION

1. Field of the Invention

The invention relates to an optical sensing mechanism, and more particularly to an optical sensor and a method of the optical sensor.

2. Description of the Prior Art

Generally speaking, a conventional scheme inevitably employs multiple optical sensors to respectively detect different motions of the surface textures of different motion objects. The circuit cost will be increased, and the arrangement of the multiple optical sensors will be difficult if the sizes of the different motion objects are small or tiny.

SUMMARY OF THE INVENTION

Therefore one of the objectives of the invention is to provide an optical sensor and a corresponding method, to solve the above-mentioned problems.

According to embodiments of the invention, a method of an optical sensor is disclosed. The method comprises: using a single image sensor array of the optical sensor to capture and generate an image frame; selecting a plurality of image regions within the image frame, the plurality of image regions being not overlapped; detecting a plurality of motion results of the plurality of image regions respectively and individually based on images of the plurality of image regions without performing object detection; and determining a plurality of motions of surface feature images respectively within the plurality of image regions according to the plurality of motion results of the plurality of image regions.

According to the embodiments, an optical sensor is disclosed. The optical sensor comprises an image sensor array and a processing circuit. The image sensor array is arranged to capture and generate an image frame. The processing circuit is coupled to the image sensor array, and is arranged for selecting a plurality of image regions within the image frame, for detecting a plurality of motion results of the plurality of image regions respectively and individually based on images of the plurality of image regions without performing object detection, and for determining a plurality of motions of surface feature images respectively within the plurality of image regions according to the plurality of motion results of the plurality of image regions, wherein the plurality of image regions are not overlapped.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of an optical sensor (or referred to as image sensor) such as a single one optical/image sensor chip and a corresponding method capable of using a single one image sensor array to determine or detect motions/movements of surface textures/features of surface feature images respectively within different divided image regions in an image frame. The number of divided image regions is equal to or larger than two and is not intended to be a limitation. The different divided image regions may respectively correspond to identical/different image depths, i.e. the surfaces which at the surface textures/features are and associated with the different divided image regions may be at identical planes or at different planes. The disclosed optical sensor can correctly and precisely detect the motions of the different surface textures/features as well as it is not needed and also not necessary for the optical sensor to perform an object identification/recognition operation upon the images of the divided image regions. It is easy to use the disclosed optical sensor to detect motions/movements of multiple surface textures/features at different planes of a three-dimensional system.

Figure 1:
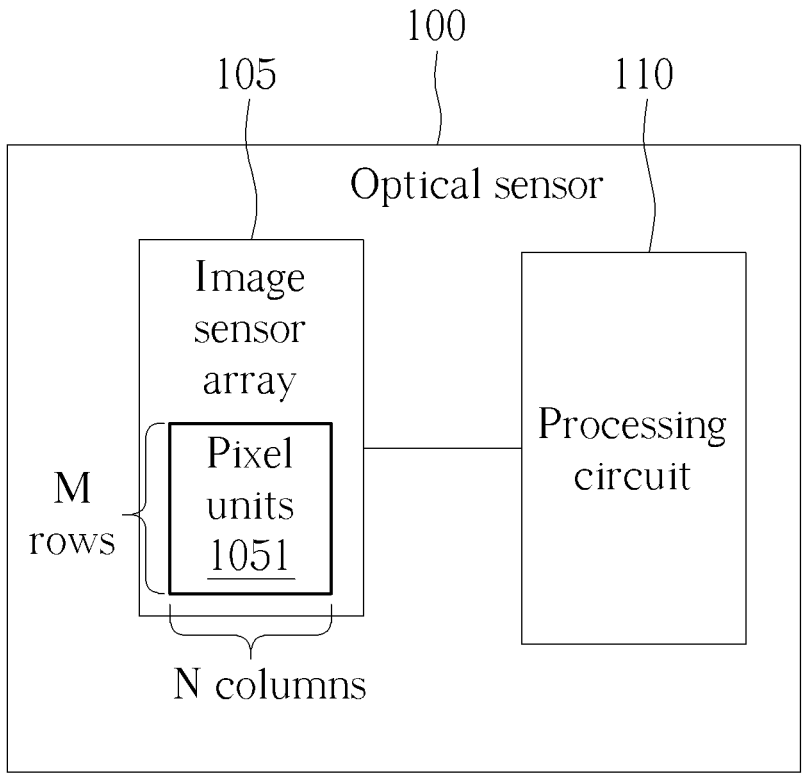
FIG. 1 is a diagram of an optical sensor such as a single one optical/image sensor chip according to an embodiment of the invention.

Refer to FIG. 1. FIG. 1 is a diagram of an optical sensor 100 such as a single one optical/image sensor chip according to an embodiment of the invention. The optical sensor 100 comprises a processing circuit 110 and a single one image sensor array 105 has a plurality of sensing pixel units 1051 being for example arranged in N columns and M rows as shown in FIG. 1.

The processing circuit 110 is coupled to the single one image sensor array 105 and is used for dividing the whole region of an image frame size into multiple image regions and then selecting a plurality of image regions among the multiple image regions. The selection can be performed in response to a user's request or according to an arrangement of the user, and the selected image regions are not overlapped. In one embodiment, the processing circuit 110 may not divide the region of the image frame size into the multiple image regions and may directly select the user preferred image regions. This is not meant to be a limitation.

The single one image sensor array 105 is used to capture and generate at least one image frame and transmit the generated image frame(s) into the processing circuit 110. For example, an image frame comprises N×M pixel values due to that the sensing pixel units 1051 are arranged in N columns and M rows.

The shapes of the selected image regions may be identical to each other, different from each other, or partially different.

For example (but not limited), in one embodiment, the shapes of the plurality of selected image regions may be rectangular or square.

Figure 2:
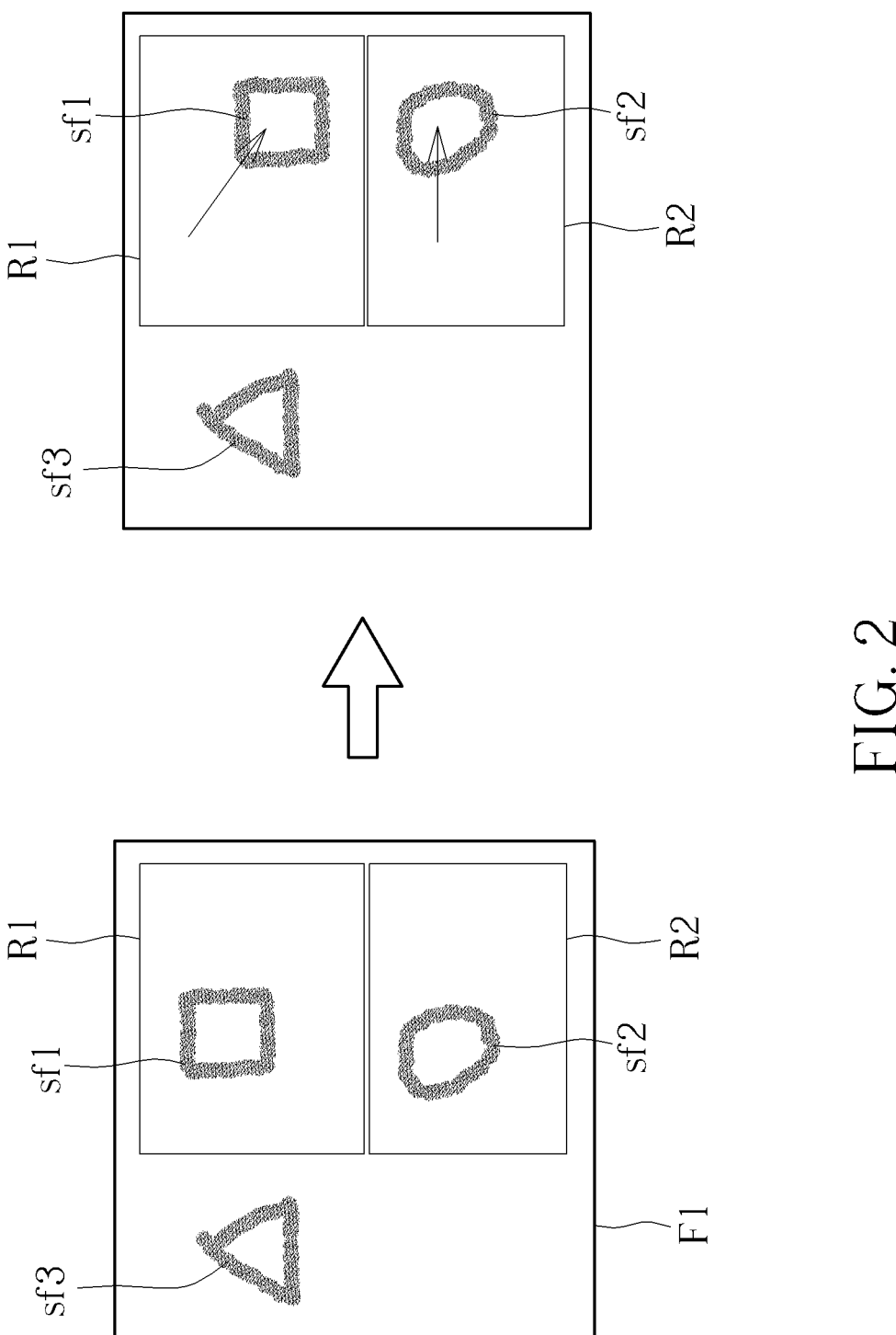
FIG. 2 is a flowchart diagram of the operations of the optical sensor as shown in FIG. 1 according to an embodiment of the invention.

FIG. 2 is a diagram of an example of the optical sensor 100 selecting two image regions which are neighbor (or substantially close to each other) according to an embodiment of the invention. In FIG. 2, the image sensor array 105 of the optical sensor 100 for example captures and generates a first image frame F1, and the processing circuit 110 selects two image regions R1 and R2 on the first image frame F1. The two image regions R1 and R2 are neighbor (or substantially close to each other). In the first image frame F1, the first image frame F1 comprises the surface texture/feature sf1, the surface texture/feature sf2, and the surface texture/feature sf3, and the surface texture/feature sf1 is in the image region R1 and the surface texture/feature sf2 is in the image region R2.

Then, the image sensor array 105 of the optical sensor 100 captures and generates a second image frame F2. Based on the same spatial position of the image region R1 respectively on the frame F1 and frame F2, the optical sensor 100 (or the processing circuit 110) calculate the pixel offsets of a larger portion of pixel units within the image region R1 between the first frame F1 and second frame F2 to detect and determine that the surface texture/feature sf1 on the image region R1 has a motion/movement such as a motion moving from the top-left corner of the image region R1 to the bottom-right corner of the image region R1; this is not intended to a limitation. For example, the image region R1 may comprise K1 pixel units having K1 pixel values respectively corresponding to different pixel positions. For one or each pixel value at a pixel position in the image region R1 of the image frame F1, the processing circuit 110 calculates the pixel difference between the pixel value in the image region R1 of the first image frame F1 and each pixel value in the same image region R1 of the second image region F2 so as to derive and obtain K1 pixel differences. Then the processing circuit 110 may find or select a minimum pixel difference among the K1 pixel differences to find the pixel position of a pixel unit/value corresponding to the minimum pixel difference. Then the processing circuit 110 obtains the pixel distance between the pixel position of the pixel value in the image region R1 of the image frame F1 and the pixel position of the pixel value corresponding to the minimum pixel difference, and the obtained pixel distance is the pixel offset of the pixel value in the image region R1. By doing so, the processing circuit 110 can calculate and obtain K1 pixel offsets respectively corresponding to the K1 pixel units in the image region R1, and the processing circuit 110 selects a statistical majority among the K1 pixel offsets as the motion/movement of the surface texture/feature sf1 in the image region R1. It should be noted that the above-mentioned procedure/operation does not involve with the object identification/recognition operation.

Similarly, Based on the same spatial position of the image region R2 respectively on the first image frame F1 and second image frame F2, the optical sensor 100 (or the processing circuit 110) calculates the pixel offsets of a larger portion of pixel units within the image region R2 between the first frame F1 and second frame F2 to detect and determine that the surface texture/feature sf2 on the image region R2 has a motion/movement such as a motion moving from the left side of the image region R2 to the right side of the image region R2; this is not intended to a limitation. For example, the image region R2 may comprise K2 pixel units having K2 pixel values respectively corresponding to different pixel positions. For one or each pixel value at a pixel position in the image region R2 of the image frame F1, the processing circuit 110 calculates the pixel difference between the pixel value in the image region R2 of the first image frame F1 and each pixel value in the same image region R2 of the second image region F2 so as to derive and obtain K2 pixel differences. Then the processing circuit 110 may find or select a minimum pixel difference among the K2 pixel differences to find the pixel position of a pixel unit/value corresponding to the minimum pixel difference. Then the processing circuit 110 obtains the pixel distance between the pixel position of the pixel value in the image region R2 of the image frame F1 and the pixel position of the pixel value corresponding to the minimum pixel difference, and the obtained pixel distance is the pixel offset of the pixel value in the image region R2. By doing so, the processing circuit 110 can calculate and obtain K2 pixel offsets respectively corresponding to the K2 pixel units in the image region R2, and the processing circuit 110 selects a statistical majority among the K2 pixel offsets as the motion/movement of the surface texture/feature sf2 in the image region R2. It should be noted that the above-mentioned procedure/operation does not involve with the object identification/recognition operation. The value of K2 can be identical to or different from the value of K1.

Similarly, based on the spatial position of the remaining image region different from the image regions R1 and R2, the optical sensor 100 (or the processing circuit 110) can calculate the pixel offsets of a larger portion of pixel units within the remaining image region between the first image frame F1 and second image frame F2 to detect and determine that the surface texture/feature sf3 on the remaining image region has no motions/movements (i.e. the surface texture/feature sf3 is a still object); this is not intended to a limitation. It should be noted the above-mentioned that procedure/operation does not involve with the object identification/recognition operation. The number of pixel units comprised by the remaining image region can be identical to or different from that of pixel units comprised by the image region R1 (or image region R2).

In this example, the optical sensor 100 can easily, correctly, and accurately determine and detect the motions of different surface textures/features, without needing to perform the object identification/recognition for the images within the image regions R1 and R2. That is, the optical sensor 100 can detect a plurality of motion results of the plurality of image regions respectively and individually based on images of the plurality of image regions without performing object detection. It is merely needed to use a single one image sensor array without performing an object identification/tracking operation to achieve generating the motion results of two or more different surface textures/features. The operation of the motion detection in the first image region R1 is not influenced by that of the motion detection in the second image region R2.

Figure 3:
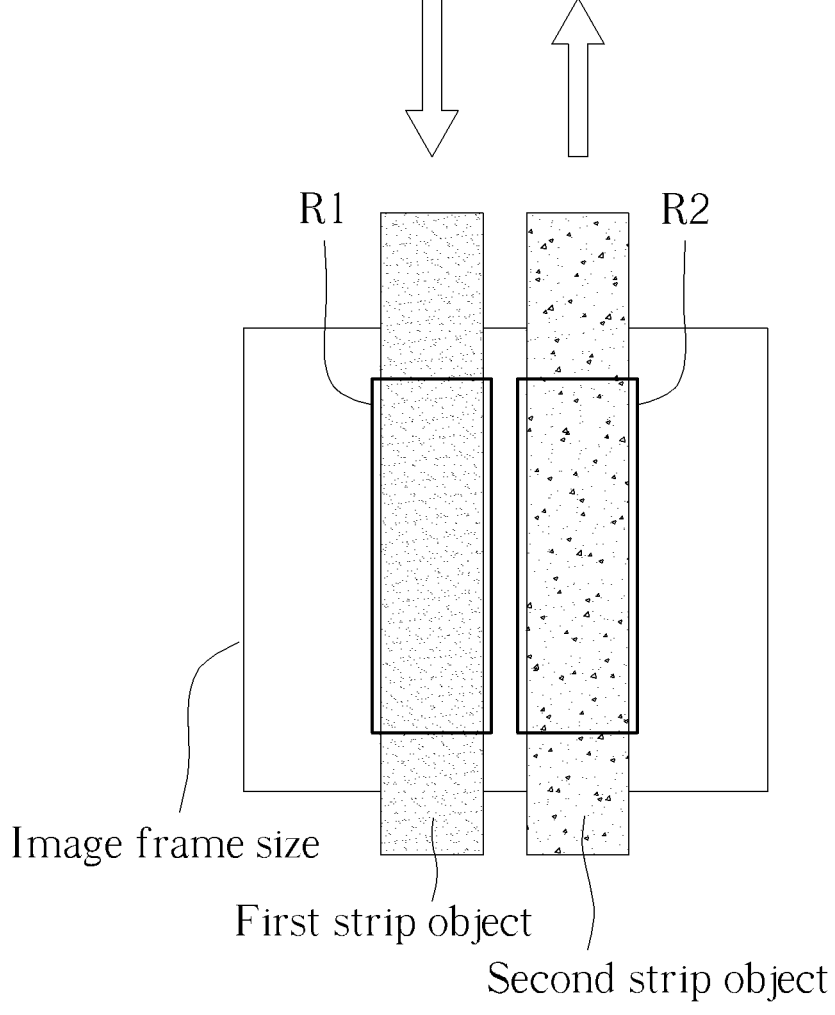
FIG. 3 is a diagram of a scenario example of the optical sensor in FIG. 1 being applied for and used for detecting the motions of the surface textures/features of different image regions located at the same plane according to an embodiment of the invention.
Figure 4:
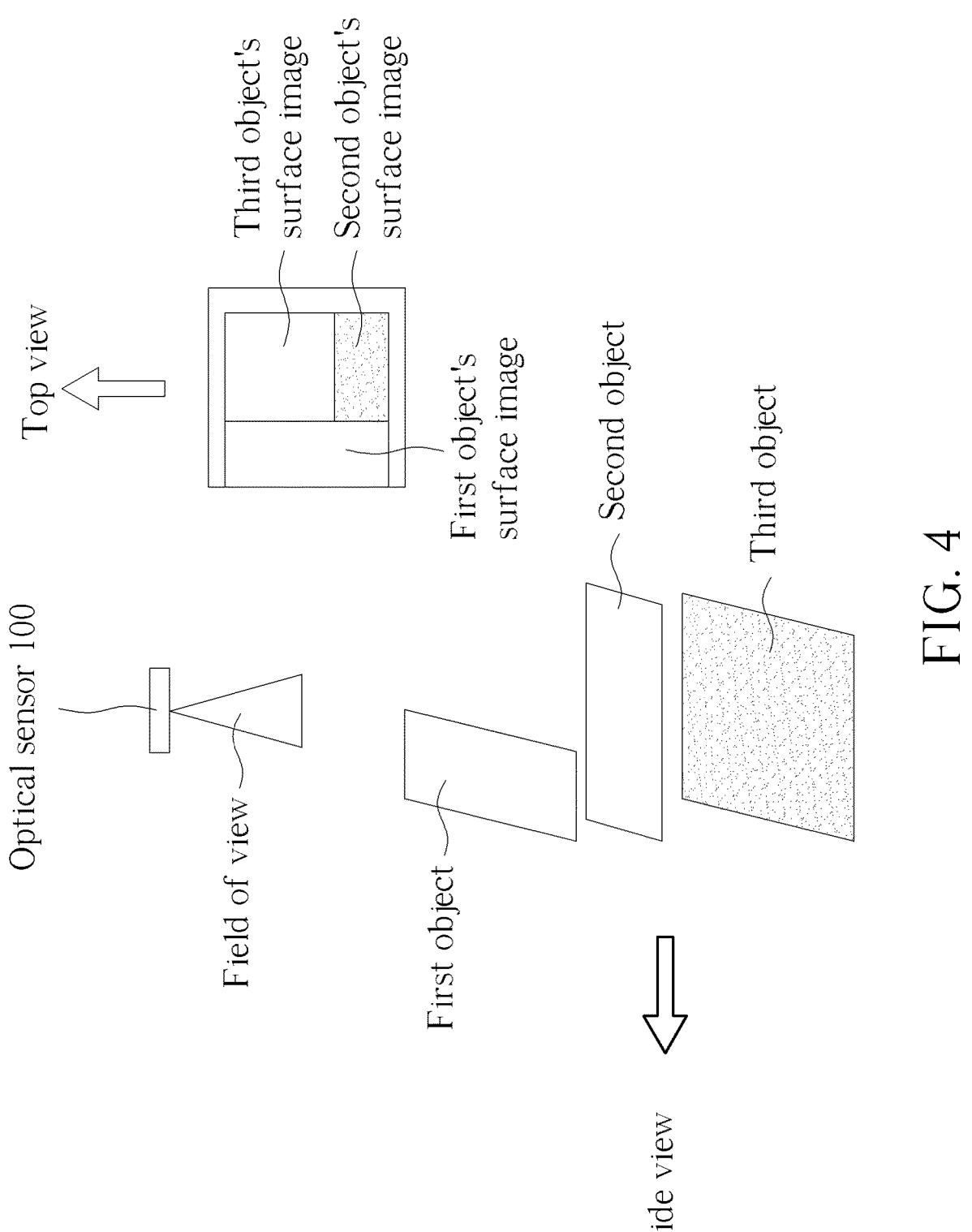
FIG. 4 is a diagram of a scenario example of the optical sensor in FIG. 1 being applied for and used for detecting the motions of the surface textures/features of different image regions located at the different planes according to an embodiment of the invention.

Further, the surface textures/features of different image regions may be located at the same plane or at different planes. FIG. 3 is a diagram of a scenario example of the optical sensor 100 in FIG. 1 being applied for and used for detecting the motions of the surface textures/features of different image regions located at the same plane according to an embodiment of the invention. FIG. 4 is a diagram of a scenario example of the optical sensor 100 in FIG. 1 being applied for and used for detecting the motions of the surface textures/features of different image regions located at the different planes according to an embodiment of the invention.

For example (but not limited), the optical sensor 100 in FIG. 1 may be disposed above the top surfaces of multiple different surface textures/features of different motion objects having different materials (or different texture/feature distributions). For example, FIG. 3 shows a top view example captured by the field of view of the optical sensor 100 which is arranged for detecting the motions/movements of two objects such as a first strip object and a second strip object wherein the first strip object may have a downward motion while the second strip object may have an upward motion; the first strip object and second strip object may have different materials or different texture/feature distributions. Based on the operations of optical sensor 100 in FIG. 1, the optical sensor 100 can easily detect and determine the different motions/movements of surface textures/features respectively within the image regions R1 and R2 in the whole image frame size without performing the object identification/recognition operation upon the images of the image regions R1 and R2 in FIG. 3. It should be noted that in this embodiment the number of selected image regions R1 and R2 is equal to two and the number of selected image regions in the other embodiments can be configured to be more than two so as to achieve detecting different motions/movements of more different objects; the number of selected image regions is not intended to be a limitation. The optical sensor 100 (or processing circuit 110) can respectively and individually perform the motion detection upon the two selected image regions R1 and R2 so as to respectively detection the upward movement/motion of the surface images for the second strip object and the downward movement/motion of the surface images for the first strip object. In this example, the first strip object and second strip object may be disposed and located at the same or substantially identical plane (i.e. the surface images of the first strip object and second strip object correspond to the same or substantially identical image depth. For example (not limited), the top surfaces of the first strip object and second strip object may be aligned with the same plane such as XY-plane defined by X-axis and Y-axis in a spatial space. By doing so, in this example, it is not needed and also not necessary for the optical sensor 100 to perform an object detection/recognition operation to identify the difference between the surface feature images of the first and second strip objects in FIG. 3.

FIG. 4 is a diagram of an example of the optical sensor 100 applied for detecting motions/movements of the top surfaces of different objects having different image depths according to an embodiment of the invention. FIG. 4 shows a top view and a sectional view of the example. As shown by the sectional view of FIG. 4, the optical sensor 100 is disposed above a first object which is disposed above a second object which is disposed above a three object, and the three different objects may have different motions/movements. The top surface of the first object is higher than the top surface of the second object which is higher than the top surface of the third object, i.e. the top surfaces of the three different objects are at different horizontal planes. According to the arrangements of the optical sensor 100 and the three objects, as shown by the top view of FIG. 4, the optical sensor 100 can capture and generate an image frame which comprises a surface image of the whole top surface of the first object, a portion of surface image of the top surface of the second object, and a portion of surface image of the top surface of the third object. The optical sensor 100 (or processing circuit 110) can select the image sizes of the surface image of the whole top surface of the first object, the portion of surface image of the top surface of the second object, and the portion of surface image of the top surface of the third object respectively as three different image regions, and then uses the selected three different image regions to detect and determine motions/movements of the three different objects without executing the object identification/recognition operation. By doing so, it is not needed to use and set multiple optical sensors to respectively detect motions of multiple different objects configured at different planes such as horizontal planes or vertical planes. Detecting motions of multiple different objects configured at different planes can be easily achieved by using the disclosed single one optical sensor 100. The circuit cost of the whole system can be significantly reduced.

Further, in the embodiments in FIG. 4, the optical sensor 100 may be used and applied in a specific three-dimensional space which is defined a specific width, a specific length, and a specific height. For example (but not limited), the specific width, specific length, and the specific height may be configured to be identical, e.g. they are equal to 5 cm. In other embodiments, the specific width, specific length, and the specific height may be configured to be different from each other or partially different. This is not intended to be a limitation.

Figure 5:
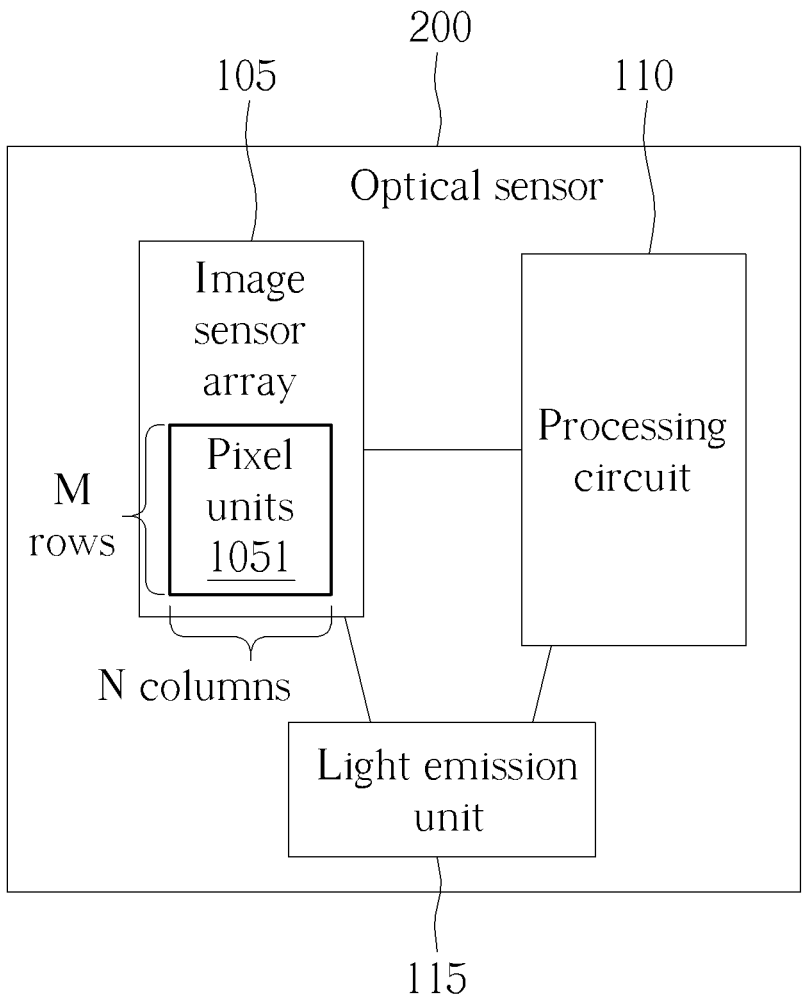
FIG. 5 is a diagram of an example of an optical sensor such as a single one optical/image sensor chip according to another embodiment of the invention.

Further, in other embodiments, the disclosed optical sensor may further comprise at least one light emission unit such as light emitting diodes (LEDs). FIG. 5 is a diagram of an example of an optical sensor 200 such as a single one optical/image sensor chip according to another embodiment of the invention. The optical sensor 200 comprises the image sensor array 105, the processing circuit 110, and a light emission unit 115. The light emission unit 115 for example is arranged to emit lights onto the top surfaces of the objects in the embodiments of FIG. 3 (or FIG. 4) at the field of view of the optical sensor 200, and the image sensor array 105 is arranged to capture and generate image frames based on the reflected lights. It should be noted that, in the embodiment of FIG. 1, the image sensor array 105 can be arranged to capture and generate image frames based on the environment lights if no light emission units are employed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of an optical sensor, comprising:
using a single image sensor array of the optical sensor to capture and generate an image frame;
selecting a plurality of image regions within the image frame respectively for a plurality of different objects, the plurality of image regions being not overlapped, and the plurality of different objects respectively having sizes being not smaller than sizes of the plurality of image regions;
detecting a plurality of motion results of the plurality of image regions respectively and individually based on images of the plurality of image regions by calculating pixel offsets of pixel units in each of the plurality of image regions without performing object detection upon the plurality of different objects; and
determining a plurality of motions of surface texture feature images of surfaces of the plurality of different objects respectively within the plurality of image regions according to the plurality of motion results of the plurality of image regions.

7

2. The method of claim 1, wherein the surface feature images respectively correspond to different image depths.

3. The method of claim 1, wherein shapes of the plurality of image regions are rectangular.

4. The method of claim 1, wherein a motion detection of a surface feature image within a first image region is not influenced by a motion detection of a surface feature image within a second image region.

5. The method of claim 1, wherein the single image sensor array of the optical sensor captures the image frame with a field of view within a specific three-dimensional space which is defined by a width of 5 cm, a length of 5 cm, and a height of 5 cm.

6. An optical sensor, comprising:

an image sensor array, arranged to capture and generate an image frame; and a processing circuit, coupled to the image sensor array, arranged for selecting a plurality of image regions within the image frame respectively for a plurality of different objects, for detecting a plurality of motion results of the plurality of image regions respectively and individually based on images of the plurality of image regions by calculating pixel offsets of pixel units in each of the plurality of image regions without performing object detection upon the plurality of different objects, and for determining a plurality of motions of surface texture feature images of surfaces of the plurality of different objects respectively within the plurality of image regions according to the plurality of motion results of the plurality of image regions, the plurality of image regions being not overlapped and the plurality of different objects respectively having sizes being not smaller than sizes of the plurality of image regions.

7. The optical sensor of claim 6, wherein the surface feature images respectively correspond to different image depths.

8. The optical sensor of claim 6, wherein shapes of the plurality of image regions are rectangular.

9. The optical sensor of claim 6, wherein a motion detection of a surface feature image within a first image region is not influenced by a motion detection of a surface feature image within a second image region.

10. The optical sensor of claim 6, wherein the single image sensor array of the optical sensor captures the image frame with a field of view within a specific three-dimensional space which is defined by a width of 5 cm, a length of 5 cm, and a height of 5 cm.

* * * * *